US011858107B2

(12) United States Patent
Wirt

(10) Patent No.: US 11,858,107 B2
(45) Date of Patent: Jan. 2, 2024

(54) HAND-PORTABLE WORKING APPARATUS AND SYSTEM

(71) Applicant: Andreas Stihl AG & Co. KG, Waiblingen (DE)

(72) Inventor: Richard Wirt, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/581,513

(22) Filed: Jan. 21, 2022

(65) Prior Publication Data

US 2022/0234188 A1 Jul. 28, 2022

(30) Foreign Application Priority Data

Jan. 22, 2021 (EP) .................................... 21152921

(51) Int. Cl.
*B25F 5/02* (2006.01)
*A45F 3/14* (2006.01)

(52) U.S. Cl.
CPC .................. *B25F 5/02* (2013.01); *A45F 3/14* (2013.01); *A45F 2200/0575* (2013.01)

(58) Field of Classification Search
CPC ........ B25F 5/026; B25F 5/02; B27B 17/0008; A45F 2200/0575; A45F 3/14; B25H 3/006
USPC .................................................. 224/268–269
See application file for complete search history.

(56) References Cited

U.S. PATENT DOCUMENTS 3,317,098 A * 5/1967 Auraen ............... B27B 17/0008 224/609
4,787,145 A * 11/1988 Klicker ..................... B27B 9/00 30/388
4,977,966 A * 12/1990 Farber ................... B25B 21/026 173/159
5,044,038 A * 9/1991 Matkovic ............... A46B 17/00 248/692
8,661,694 B2 * 3/2014 Bijsterveldt .............. B25F 5/02 30/298.4
11,202,475 B2 * 12/2021 Milling .............. A41D 13/0543
(Continued)

FOREIGN PATENT DOCUMENTS

EP 3 133 973 B1 2/2018
EP 3 560 660 A1 10/2019
EP 3560660 A1 * 10/2019 ............... A45F 5/00

OTHER PUBLICATIONS

German-language European Search Report issued in European Application No. 21152921.9 dated Jun. 8, 2021 with partial English translation (eight (8) pages).

*Primary Examiner* — Adam J Waggenspack
(74) *Attorney, Agent, or Firm* — Crowell & Moring LLP

(57) ABSTRACT

A hand-portable working apparatus has: a working device, at least one handle, and a transport eyelet. The handle is at least partially arranged behind the working device along a longitudinal axis of the working apparatus. At least the handle defines a handle opening, wherein the handle opening extends approximately along the longitudinal axis. The transport eyelet is arranged approximately at or before a front end of the handle opening along the longitudinal axis. At least the transport eyelet defines an eyelet opening, wherein, in an attaching and/or detaching position of the transport eyelet, an eyelet opening normal of the eyelet opening is oriented approximately along a vertical axis of the working apparatus.

18 Claims, 6 Drawing Sheets

(56) References Cited

U.S. PATENT DOCUMENTS

| | | | | |
|---|---|---|---|---|
| 11,338,427 | B2 * | 5/2022 | Nick | B25F 5/001 |
| 11,344,106 | B2 * | 5/2022 | Nishimura | F16B 2/248 |
| 11,498,238 | B2 * | 11/2022 | Huber | B27B 17/0008 |
| 2009/0134191 | A1 * | 5/2009 | Phillips | B25F 5/02<br>362/183 |
| 2019/0358801 | A1 | 11/2019 | McCue et al. | |
| 2020/0180124 | A1 * | 6/2020 | Ellice | B25F 5/026 |
| 2021/0023690 | A1 | 1/2021 | Lachica Koch et al. | |

* cited by examiner

HAND-PORTABLE WORKING APPARATUS AND SYSTEM

CROSS REFERENCE TO RELATED APPLICATION

This application claims priority under 35 U.S.C. § 119 from European Patent Application No. 21152921.9, filed Jan. 22, 2021, the entire disclosure of which is herein expressly incorporated by reference.

BACKGROUND AND SUMMARY OF THE INVENTION

The invention relates to a hand-portable working apparatus and to a system having such a working apparatus.

The invention is based on the problem of providing a hand-portable working apparatus which has improved properties and is therefore more user-friendly, and a system having such a working apparatus.

The invention solves the problem by providing a hand-portable working apparatus and/or a system in accordance with the independent claims. Advantageous developments and/or refinements of the invention are described in the dependent claims.

The hand-portable working apparatus or work appliance according to the invention comprises or has a working device, at least an, in particular first, handle, in particular handle portion, and a transport or securing eyelet. The handle is at least partially, in particular completely, arranged behind the working device along or parallel or on a longitudinal axis or longitudinal direction of the working device. At least the handle defines or surrounds an, in particular first, handle opening. The handle opening extends approximately or substantially, in particular precisely, along or parallel to the longitudinal axis. The transport eyelet is arranged approximately or substantially, in particular precisely, in particular completely, at or before a front end of the handle opening along or parallel or on the longitudinal axis. At least, in particular only, the transport eyelet defines or surrounds an eyelet opening. An eyelet opening normal or orthogonal of the eyelet opening points or is oriented approximately or substantially, in particular precisely, along or parallel or on a vertical axis or in a vertical direction of the working apparatus in an attaching and/or detaching position of the transport eyelet.

This makes it possible, in particular the arrangement of the handle and the extent of the handle opening make it possible, to comfortably carry or hold the working device, in particular at the handle and/or by, in particular only one, in particular single, hand and/or for good working using the working device.

In addition or alternatively, this makes it possible, in particular the arrangement of the transport eyelet and the orientation of the eyelet opening normal make it possible, to carry or hold the working apparatus unobstructed or undisturbed by the transport eyelet, in particular at the handle and/or by, in particular only one, in particular single, hand, and/or to simply and therefore rapidly and/or securely incorporate or mount and/or remove or unhook the transport eyelet, in particular in the attaching and/or detaching position, into and/or from an apparatus securing element, in particular by carrying or holding the working apparatus at the handle and/or by, in particular only one, in particular single, hand.

This therefore makes it possible for the working apparatus to be user-friendly.

In particular, hand-portable working apparatus can mean that the working apparatus can have a mass of a maximum of 50 kg (kilograms), in particular a maximum of 20 kg, in particular a maximum of 10 kg, and/or a minimum of 1 kg, in particular a minimum of 2 kg, in particular a minimum of 5 kg.

The working apparatus can be a garden, forestry and/or construction apparatus.

The working apparatus, in particular the working device, can be motor-driven, in particular driven by an internal combustion engine and/or an electric motor. In particular, a user-actuable operating element for operating a motor drive system, in particular an internal combustion engine and/or electric motor drive system, of the working apparatus can be arranged on, in particular fastened to, the handle.

The working device can have, in particular can be, a working element and/or a working implement.

The handle or the handle opening can be designed or configured for carrying or holding by one hand. Additionally or alternatively, the handle can have at least one handle tube.

Approximately along the longitudinal axis can mean an angular deviation of a maximum of 30° (degrees), in particular a maximum of 20°, in particular a maximum of 10°, in particular a maximum of 5°, from the longitudinal axis.

The front end can be closer to the working device than a rear end of the handle opening.

Approximately at the front end can mean closer to the front end than a center of the handle opening.

The transport eyelet can be arranged outside the handle opening and/or arranged, in particular fastened, in particular completely, on or to the handle.

In particular in the attaching and/or detaching position, the transport eyelet can be designed or configured for attaching or hooking into, and/or for detaching or unhooking from, the apparatus securing element. In particular, the apparatus securing element can have or comprise, in particular can be, a snap hook, a strap, a rope, a belt and/or a cord. Additionally or alternatively, the transport eyelet can have, in particular can be, an eye, a ring, a hoop and/or a loop. Furthermore additionally or alternatively, the transport eyelet or the eyelet opening can be, in particular designed to be, closed. Furthermore additionally or alternatively, an, in particular central, diameter of the transport eyelet can be or lie in the range of 1 cm (centimetre) to 5 cm, in particular of 2 cm and/or up to 4 cm.

The transport eyelet or eyelet opening can define an eyelet opening plane, in particular can lie in an eyelet opening plane, wherein the eyelet opening normal can be normal or orthogonal to the eyelet opening plane.

Approximately along the vertical axis can mean an angular deviation of a maximum of 30°, in particular a maximum of 20°, in particular a maximum of 10°, in particular a maximum of 5°, from the vertical axis.

The vertical axis can be orthogonal to the longitudinal axis. Additionally or alternatively, during, in particular correct, carrying or holding of the working apparatus, in particular by way of the handle, and/or during, in particular correct, orienting of the working apparatus, in particular by means of the center of gravity or gravitational force, and/or during an, in particular correct, operating position or operating orientation of the working apparatus, in particular of the working device, the vertical axis can be in particular oriented approximately, in particular precisely, vertically.

In a development of the invention, the handle opening extends approximately or substantially, in particular precisely, along or parallel to the vertical axis. In particular, the transport eyelet is arranged, in particular completely, along or parallel or on the vertical axis approximately or substantially, in particular precisely, at or above an upper end of the handle opening. This enables particularly comfortable and/or unobstructed or undisturbed carrying or holding of the working apparatus and/or an, in particular correct, orienting of the working apparatus, in particular by means of the center of gravity or gravitational force, and/or a particularly simple and therefore particularly rapid and/or secure attaching or hooking and/or detaching or unhooking of the transport eyelet into and/or from the apparatus security element. In particular, the upper end of the working device can be more remote than a lower end of the handle opening. Additionally or alternatively, approximately at the upper end can mean closer to the upper end than a, in particular the, center of the handle opening.

In a development of the invention, the working device extends along or parallel to the longitudinal axis, in particular forward. This permits good working using the working device. In particular, the working device can extend along or parallel to the vertical axis. Additionally or alternatively, at least, in particular only, the working device can define the longitudinal axis, in particular and the vertical axis.

In a development of the invention, the working apparatus is in particular either a leaf blower or a blower or a saw, in particular a chainsaw, in particular a top-handle saw. Additionally or alternatively, the working device comprise or has in particular either an, in particular elongate, blowing tube or an, in particular elongate, saw rail or guide rail and a saw chain, in particular is a blowing tube or a saw rail or guide rail and a saw chain. The previously mentioned arrangements and orientation particularly permit the previously mentioned advantages for such a working apparatus and/or such a working device. In particular, the leaf blower can have or comprise an, in particular motor-driven, ventilator fan, in particular driven by an internal combustion engine and/or an electric motor, and/or can be designed or configured for generating a gas flow, in particular an air flow, through the blowing tube.

In a development of the invention, the transport eyelet is arranged, in particular completely, to the side of the handle opening along or parallel or on a transverse axis or in a transverse direction of the working apparatus. This permits a particularly comfortable and/or unobstructed or undisturbed carrying or holding of the working apparatus and/or a particularly simple and therefore particularly rapid and/or secure attaching or hooking and/or detaching or unhooking of the transport eyelet into and/or from the apparatus securing element. In particular, the transverse axis can be orthogonal to the longitudinal axis and/or the vertical axis. Additionally or alternatively, at least, in particular only, the working device can define the transverse axis. Furthermore additionally or alternatively, in the case of the leaf blower, the transport eyelet or the eyelet opening can be arranged on the left of the handle opening. Furthermore additionally or alternatively, in the case of the saw, the transport eyelet or the eyelet opening can be arranged on the right of the handle opening.

In a refinement of the invention, the working apparatus comprises or has a further, in particular second, handle, in particular handle portion. At least the further handle defines or surrounds a further, in particular second, handle opening. The further handle is arranged, in particular completely, opposite to or on an opposite side from the transport eyelet to the side, in particular on the left, of the handle opening along or parallel or on the transverse axis. In particular, the further handle opening extends approximately or substantially, in particular precisely, along or parallel to the transverse axis, in particular and approximately or substantially, in particular precisely, along or parallel to the vertical axis. Additionally or alternatively, the further handle is arranged, in particular completely, approximately or substantially, in particular precisely, at or before the front end of the handle opening along or parallel to or on the vertical axis. This permits a particularly comfortable and/or unobstructed or undisturbed carrying or holding of the working apparatus, in particular at the further handle and/or by a further hand and/or for working using the working device. In particular, the further handle or the further handle opening can be designed or configured for carrying or holding by a further hand. Additionally or alternatively, the further handle can have at least one further handle tube. Furthermore additionally or alternatively, approximately along the transverse axis can mean an angular deviation of a maximum of 30°, in particular a maximum of 20°, in particular a maximum of 10°, in particular a maximum of 5°, from the transverse axis.

In a development, in particular a refinement, of the invention, the handle with the front end of the handle opening, the transport eyelet and/or the further handle, if present, are/is arranged, in particular completely, along the longitudinal axis approximately or substantially, in particular precisely, at a center of gravity of the working apparatus, in particular in an operationally ready state. This permits a particularly comfortable carrying or holding of the working apparatus, in particular at the handle, the transport eyelet and/or the further handle, and/or an, in particular correct, orienting of the working apparatus, in particular by means of the force of gravity or gravitational force. In particular, approximately at the center point of gravity can mean remote from the center of gravity along the longitudinal axis by a maximum of 5 cm, in particular a maximum of 2 cm, in particular a maximum of 1 cm.

In a development, in particular a refinement, of the invention, the handle, the transport eyelet and/or the further handle, if present, are/is arranged, in particular completely, along the vertical axis above an, in particular the, center of gravity of the working apparatus, in particular in an operationally ready state and/or an, in particular correct, operating position or operating orientation. This permits particularly comfortable carrying or holding of the working apparatus, in particular at the handle, the transport eyelet and/or the further handle, and/or an, in particular correct, orienting of the working apparatus, in particular by means of the force of gravity or gravitational force.

In a development, in particular a refinement, of the invention, the working apparatus comprises or has an apparatus housing. The handle, the transport eyelet and/or the further handle, if present, are/is arranged, in particular completely, along or parallel to or on the vertical axis at the top of the apparatus housing, in particular in an, in particular correct, operating position or operating orientation of the working apparatus. This permits particularly comfortable carrying or holding of the working apparatus, in particular at the handle, the transport eyelet and/or the further handle, and/or an, in particular correct, orienting of the working apparatus, in particular by means of the force of gravity or gravitational force, and/or a compact design of the working apparatus. In particular, the apparatus housing can be arranged at least partially, in particularly completely, behind the working device along or parallel to or on the vertical axis. Additionally or alternatively, the apparatus housing can define or surround, in particular co-define or co-surround the handle opening and/or the further handle opening. Furthermore additionally or alternatively, a drive motor, in particular an internal combustion engine and/or an electric drive motor, of the working apparatus, can be arranged, in particular completely, in the apparatus housing.

In a development of the invention, the transport eyelet is at least partially, in particular completely, adjustable, in particular rotatable or foldable, between the attaching and/or detaching position, in particular wherein the transport eyelet protrudes from the handle in the attaching and/or detaching position, and a stowing position which is different from the attaching and/or detaching position, in particular wherein the transport eyelet lies, in particular completely, against the handle in the stowing position, and/or wherein, in the stowing position, the eyelet opening normal is oriented or points approximately or substantially, in particular precisely, along or parallel to or on a, in particular the, transverse axis or in a, in particular the, transverse direction of the working apparatus. This, in particular the stowing position, permits particularly unobstructed or undisturbed carrying or holding of the working apparatus. In particular, the transport eyelet, in particular in the stowing position, does not need to be designed or configured for attaching or hooking and/or for detaching or unhooking into the and/or from the apparatus securing element. Additionally or alternatively, approximately along the transverse axis can mean an angular deviation of a maximum of 30°, in particular a maximum of 20°, in particular a maximum of 10°, in particular a maximum of 5°, from the transverse axis. Furthermore additionally or alternatively, the transport eyelet can be adjustable approximately about the longitudinal axis and/or by means of a joint and/or a hinge, in particular of the working apparatus, and/or without an implement. In particular, the transport eyelet can be arranged on, in particular fastened to, the handle by means of the joint and/or the hinge.

In a refinement of the invention, the handle can be arranged for carrying by one hand, in particular by at least one finger of the hand, and the transport eyelet for being simultaneously adjusted by the same hand, in particular by a different finger of the hand. In particular, the transport eyelet is arranged on, in particular fastened to, the handle. This permits one-handed handling or operation of the working apparatus.

In a refinement of the invention, the working apparatus comprises or has at least one locking member. The at least one locking member is designed or configured to fix or secure or hold the transport eyelet in the attaching and/or detaching position and/or the stowing position. This permits a reliable orientation of the transport eyelet, in particular of the eyelet opening normal, or avoiding or even preventing an unintentional or inadvertent adjustment of the transport eyelet. In particular the locking member can have, in particular can be, a projection and/or a stop and/or a spring, and/or can be designed to fix the transport eyelet by means of a form fit and/or a force fit. Additionally or alternatively, the locking member can be designed so as, when a force limit value is reached or exceeded, to enable an adjustment of the transport eyelet, in particular from the attaching and/or detaching position into the stowing position and/or from the stowing position into the attaching and/or detaching position. In particular, the force limit value can be a minimum of 1 N (newton) and/or a maximum of 20 N, in particular 5 N.

In a development of the invention, an, in particular first, portion of an outer contour of the transport eyelet comprises or has an, in particular concave, depression for, in particular stabilized, opening or pushing in of a snapper of an apparatus securing element having or comprising a snap hook or in the form of a snap hook for hooking the transport eyelet in the snap hook. In particular, the portion of the outer contour faces away from the handle, in particular and is remote therefrom, in the attaching and/or detaching position. This permits an attaching or hooking of the transport eyelet, in particular in the attaching and/or detaching position, into the apparatus securing element by, in particular only one, in particular single, hand. In particular, the outer contour can be facing away from the eyelet opening.

In a development of the invention, an, in particular second, portion of an inner contour or of an internal contour of the transport eyelet can be shaped for opening or pushing in an, in particular the, snapper of an, in particular the, apparatus securing element having or comprising an, in particular the, snap hook or in the form of the snap hook for unhooking the transport eyelet from the snap hook. In particular, the portion of the inner contour faces away from the handle, in particular and is close thereto, in the attaching and/or detaching position. This permits detaching or unhooking of the transport eyelet, in particular in the attaching and/or detaching position, from the apparatus securing element by, in particular only one, in particular single, hand. In particular, the inner contour can be facing the eyelet opening. Additionally or alternatively, the portion of the inner contour can be different from the portion of the outer contour having the depression.

The system according to the invention comprises or has a hand-portable, in particular the hand-portable, working apparatus as previously mentioned and an, in particular the, apparatus securing element, in particular and a climbing harness. In particular, the apparatus securing element can be arranged on, in particular fastened to, the climbing harness.

Further advantages and aspects of the invention emerge from the claims and from the description of exemplary embodiments of the invention that are explained below with reference to the figures.

DETAILED DESCRIPTION OF THE DRAWINGS

Figure 1:
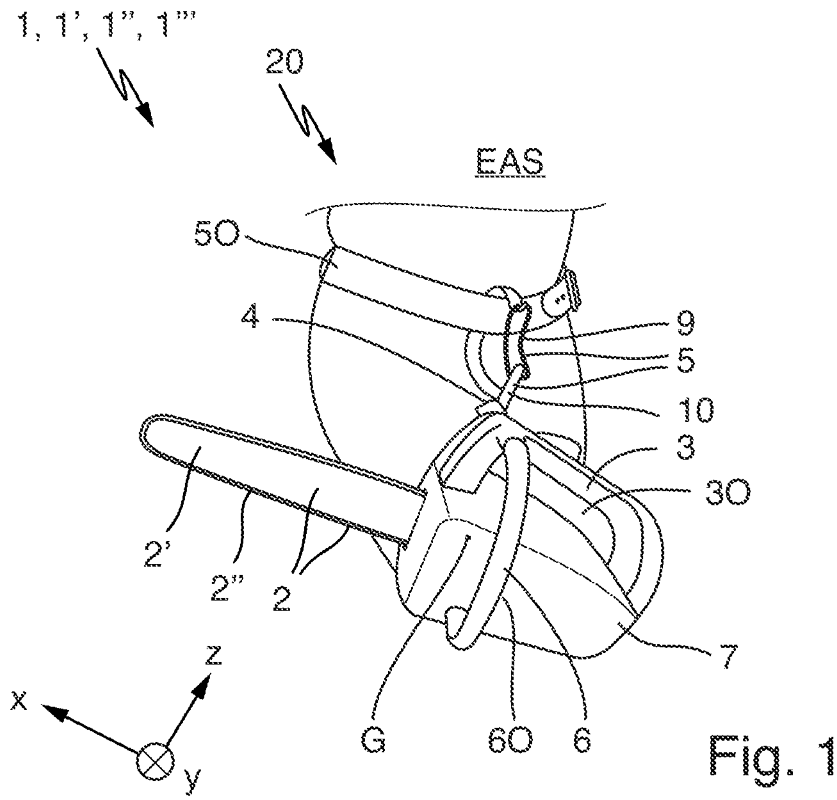
FIG. 1 is a perspective view of a system according to an embodiment of the invention having a hand-portable working apparatus according to an embodiment of the invention in the form of a saw having a transport eyelet attached in an apparatus securing element having a snap hook arranged on a climbing harness.
Figure 2:
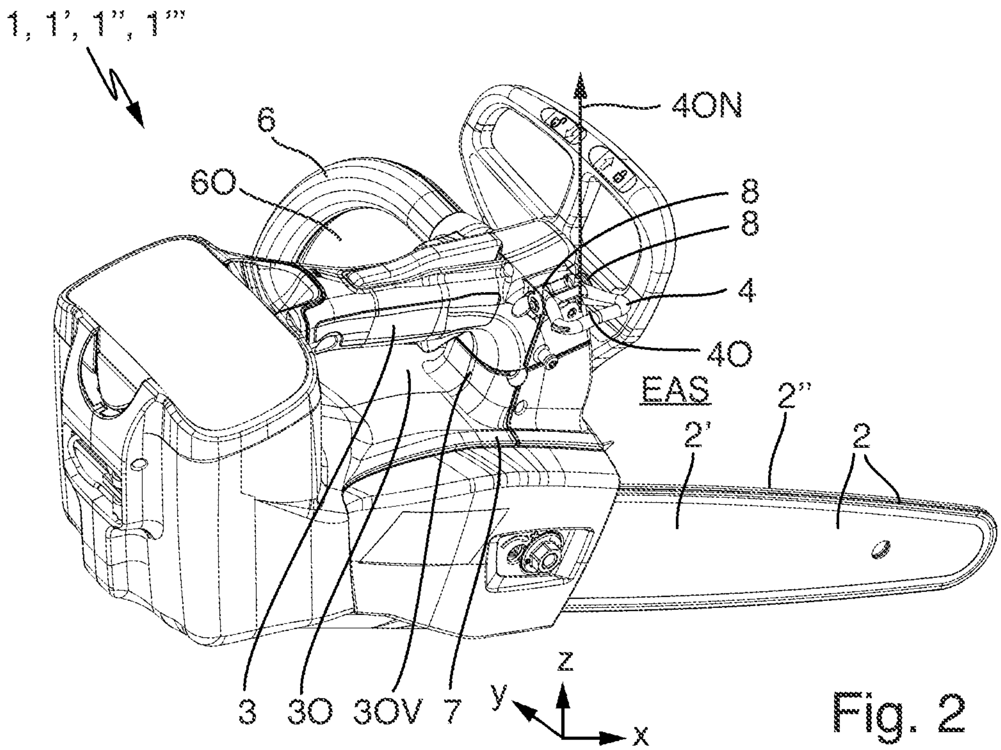
FIG. 2 is a perspective view of the working apparatus of FIG. 1 having the transport eyelet in an attaching and/or detaching position.
Figure 3:
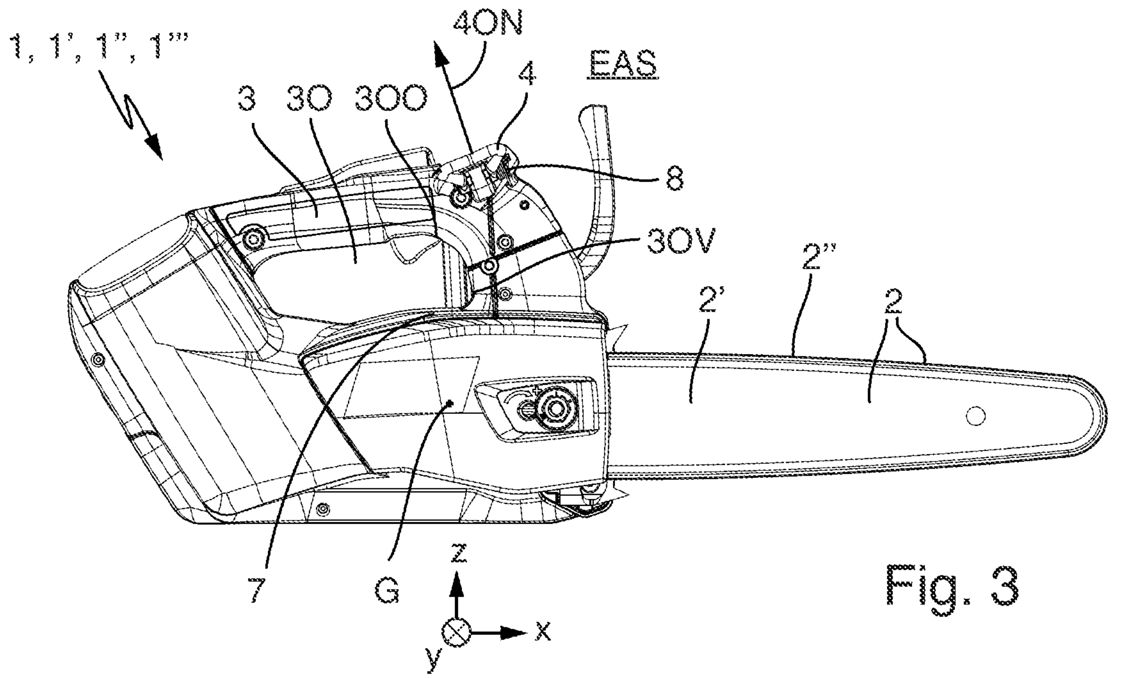
FIG. 3 is a top view of the working apparatus of FIG. 2.
Figure 4:
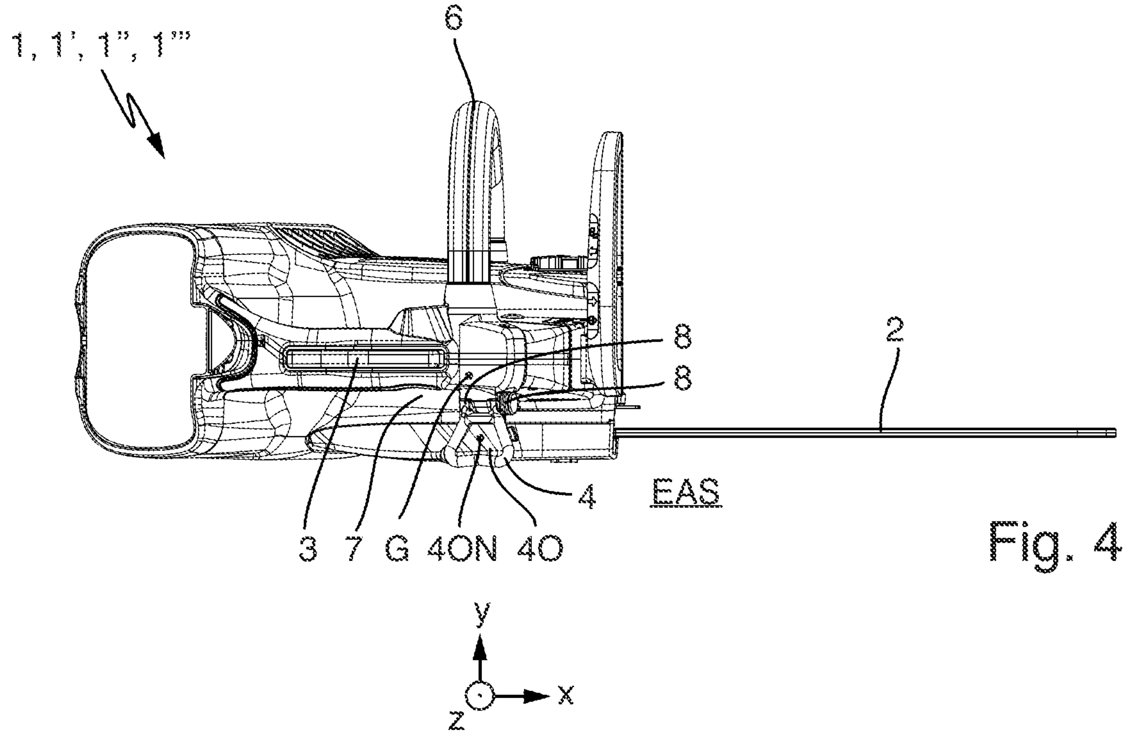
FIG. 4 is a side view of the working apparatus of FIG. 2.
Figure 7:
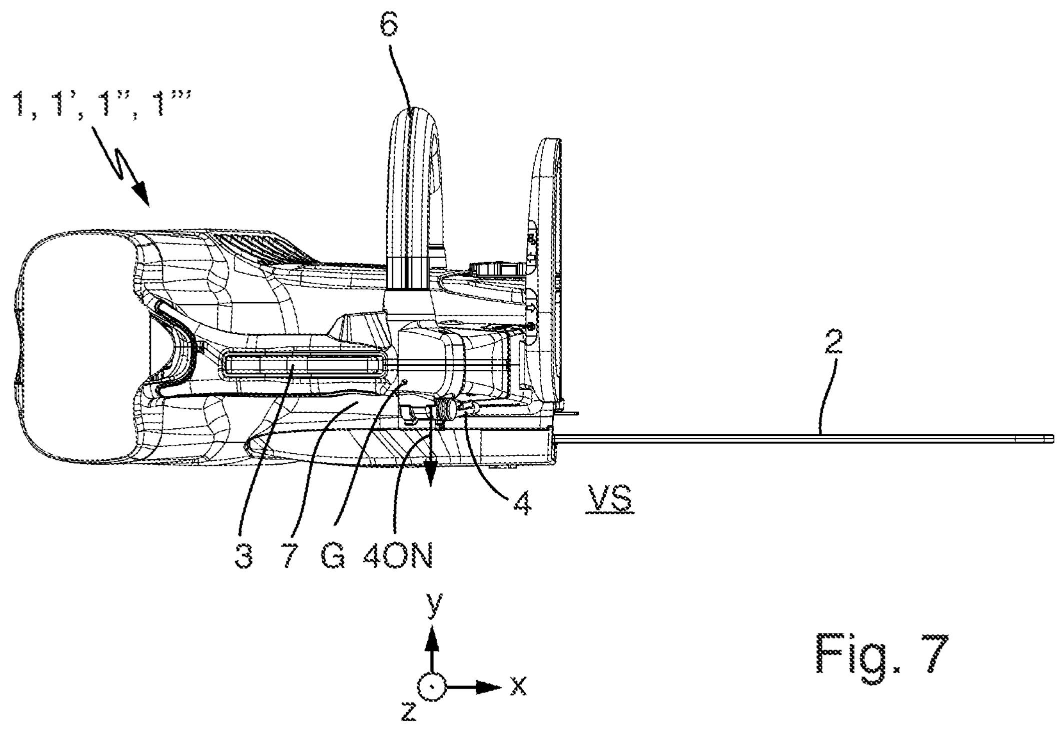
FIG. 7 is a side view of the working apparatus of FIG. 5.
Figure 8:
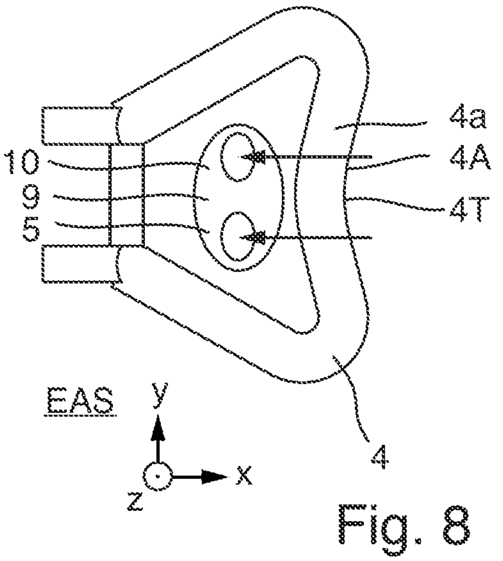
FIG. 8 is a schematic view of an attaching or hooking of the transport eyelet in the snap hook of FIG. 1.
Figure 9:
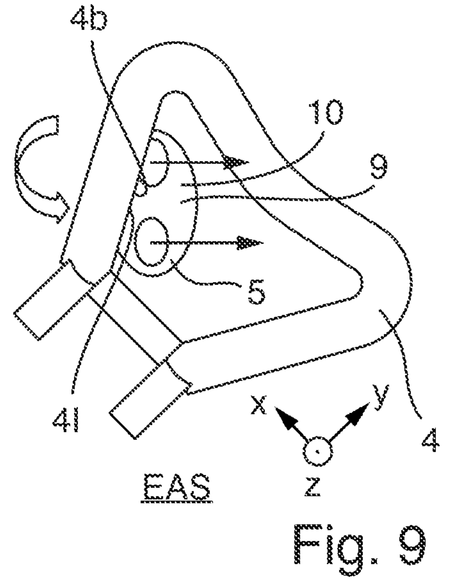
FIG. 9 is a schematic view of detaching or unhooking the transport eyelet from the snap hook of FIG. 1.

FIG. 1 shows a system 20 having a hand-portable working apparatus as shown in FIGS. 1 to 11 and an apparatus securing element 5 as shown in FIGS. 1, 8 and 9, in particular, and a climbing harness 50 as shown in FIG. 1.

In particular, the apparatus securing element 5 is arranged on, in particular fastened to, the climbing harness 50.

Figure 10:
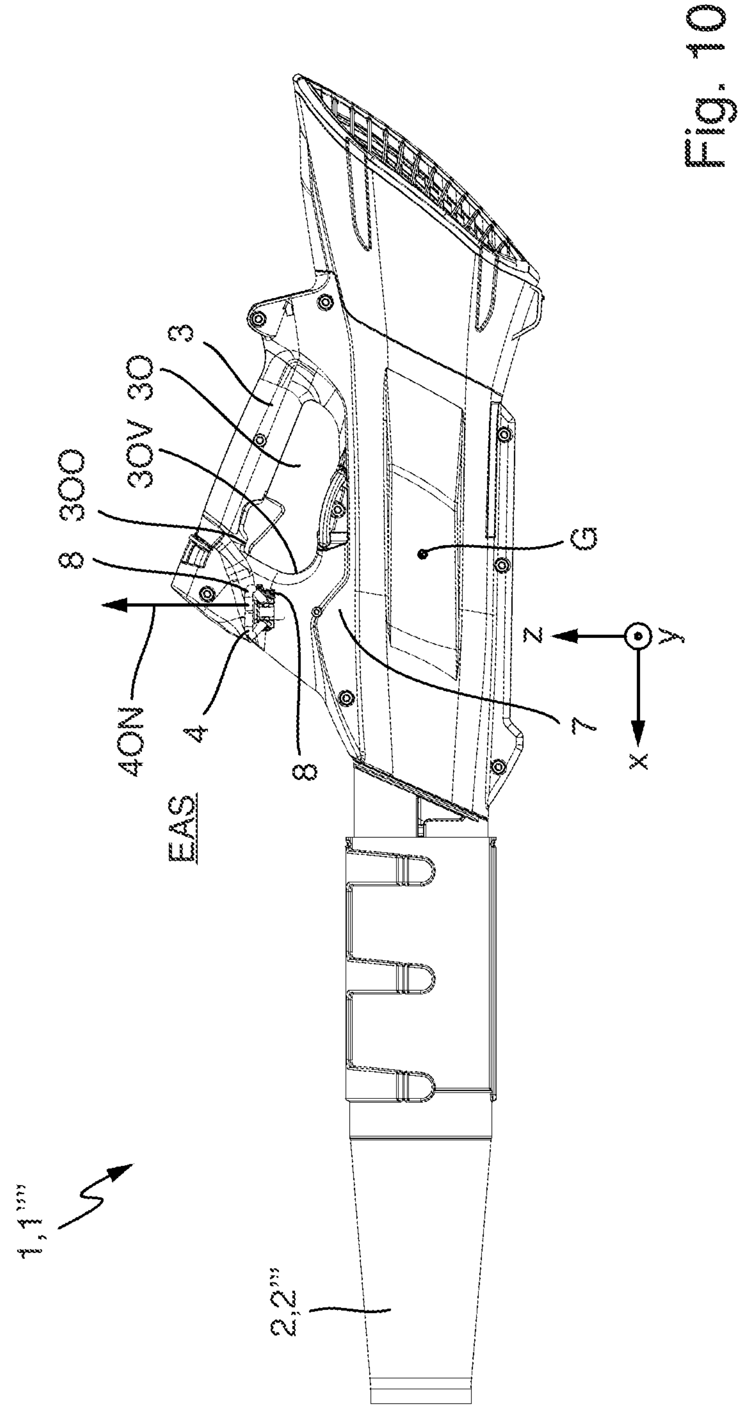
FIG. 10 is a side view of a further hand-portable working apparatus according to an embodiment of the invention in the form of a leaf blower having a transport eyelet in an attaching and/or detaching position.
Figure 11:
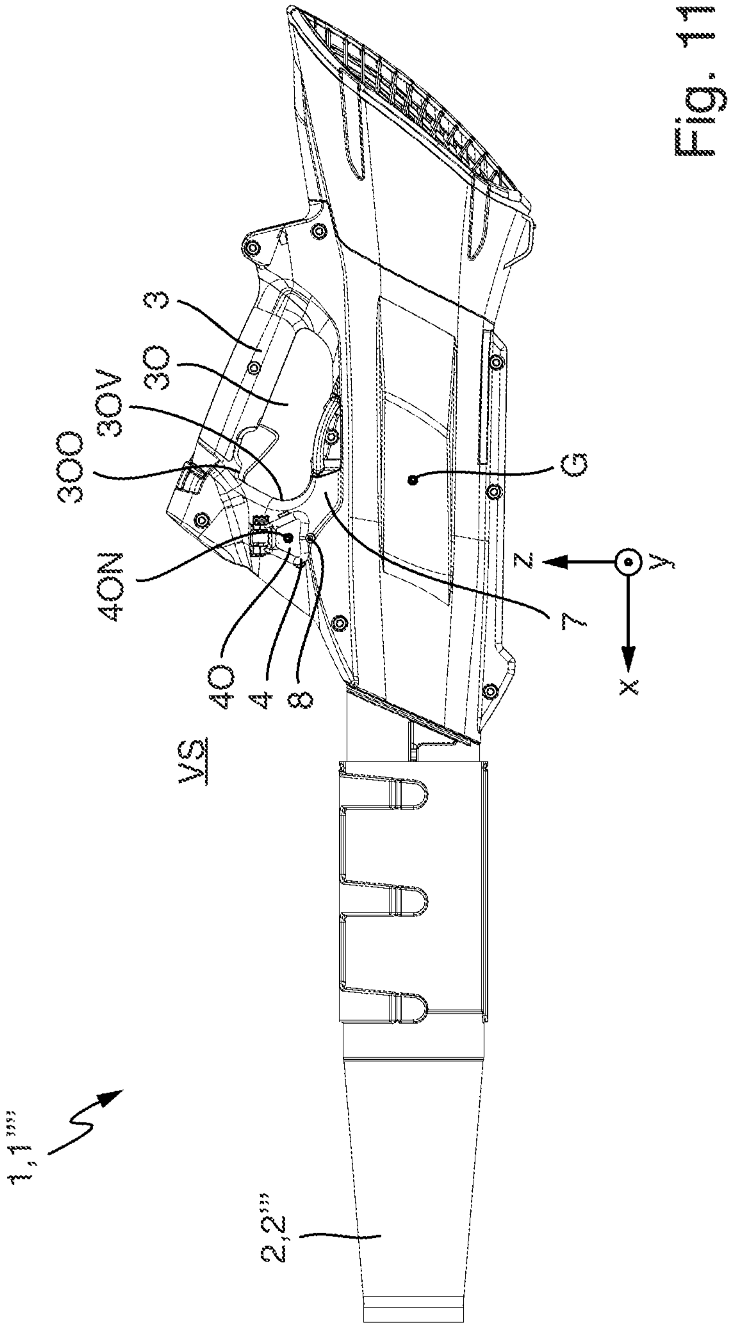
FIG. 11 is a side view of the working apparatus of FIG. 10 having the transport eyelet in a stowing position.

The working apparatus 1 has a working device 2, at least one handle 3 and a transport eyelet 4. The handle 3 is at least partially, in particular completely, arranged behind the working device 2 along an, in particular horizontal, longitudinal axis x of the working apparatus 1. At least the handle 3 defines a handle opening 3O. The handle opening 3O extends approximately, in particular precisely, along the longitudinal axis x. In FIGS. 1 to 7, the transport eyelet 4 is arranged approximately, in particular precisely, at a front end 3OV of the handle opening 3O along the longitudinal axis x. In FIGS. 10 and 11, the transport eyelet 4 is arranged before the front end 3OV of the handle opening 3O along the longitudinal axis x. At least the transport eyelet 4 defines an eyelet opening 4O. In an attaching and/or detaching position EAS, as shown in FIGS. 1 to 4 and 8 to 10, of the transport eyelet 4, an eyelet opening normal 4ON of the eyelet opening 4O is oriented approximately, precisely in FIG. 10, along an, in particular vertical, axis z of the working apparatus 1.

In detail, the handle opening 3O extends approximately, in particular precisely, along the vertical axis z. In the exemplary embodiment shown, the transport eyelet 4 is arranged above an upper end 3OO of the handle opening 3O along the vertical axis z. In alternative exemplary embodiments, the transport eyelet can be arranged approximately, in particular precisely, at the upper end of the handle opening along the vertical axis.

Furthermore, the working device 2 extends, in particular forward, along the longitudinal axis x.

In FIGS. 1 to 7, the working apparatus 1 is a saw 1', in particular a chain saw 1", in particular a top-handle saw 1'". Additionally or alternatively, the working device 2 has a saw rail 2' and a saw chain 2", in particular is a saw rail 2' and a saw chain 2".

In FIGS. 10 and 11, the working apparatus 1 is a leaf blower 1"". Additionally or alternatively, the working device 2 has a blowing tube 2'", in particular is a blowing apparatus 2'".

In addition, the transport eyelet 4 is arranged to the side of the handle opening 3O along an, in particular horizontal, transverse axis y of the working apparatus 1.

In FIGS. 1 to 7 or in the case of the saw 1', the transport eyelet 4 or the eyelet opening 4O is arranged on the right of the handle opening 3O.

In FIGS. 10 and 11 or in the case of the leaf blower 1"", the transport eyelet 4 or the eyelet opening 4O is arranged on the left of the handle opening 3O.

In particular, the working apparatus 1 in FIGS. 10 and 11 or the leaf blower 1"" has only a single handle 3.

In detail, the working apparatus 1, in particular in FIGS. 1 to 7 or the saw 1', has a further handle 6. At least the further handle 6 defines a further handle opening 6O. The further handle 6 is arranged opposite the transport eyelet 4 to the side, in particular on the left, of the handle opening 3O along the transverse axis y. In particular, the further handle opening 6O extends approximately, in particular precisely, along the transverse axis y, in particular and approximately along the vertical axis z. In the exemplary embodiment which is shown, the further handle 6 is arranged approximately, in particular precisely, at the front end 3OV of the handle 3O along the longitudinal axis x. In alternative exemplary embodiments, the further handle can be arranged before the front end of the handle opening along the longitudinal axis.

Furthermore, the handle 3 with the front end 3OV of the handle opening 3O, the transport eyelet 4 and/or the further handle 6 are/is arranged approximately, in particular precisely, at a center point of gravity G of the working apparatus 1 along the longitudinal axis x, as shown in FIGS. 1 and 7 and for the saw 1'.

In addition, the handle 3, the transport eyelet 4 and/or the further handle 6 are/is arranged above the center of gravity G of the working apparatus 1 along the vertical axis z, as shown in FIGS. 1 to 7, 10 and 11.

Furthermore, the working apparatus 1 has an apparatus housing 7. The handle 3, the transport eyelet 4 and/or the further handle 6 are/is arranged at the top of the apparatus housing 7 along the vertical axis z, as shown in FIGS. 1 to 7, 10 and 11.

In addition, the transport eyelet 4 is at least partially, in particular completely, adjustable, in particular rotatable, between the attaching and/or detaching position EAS and a stowing position VS which is different from the attaching and/or detaching position EAS, as shown in FIGS. 5 to 7 and 11. In particular, the transport eyelet 4 protrudes from the handle 3 in the attaching and/or detaching position EAS. Additionally or alternatively, the transport eyelet 4 lies against the handle 3 in the stowing position VS. Furthermore additionally or alternatively, the eyelet opening normal 4ON is oriented approximately, in particular precisely, along the transverse axis y of the working apparatus 1 in the stowing position VS.

Figure 5:
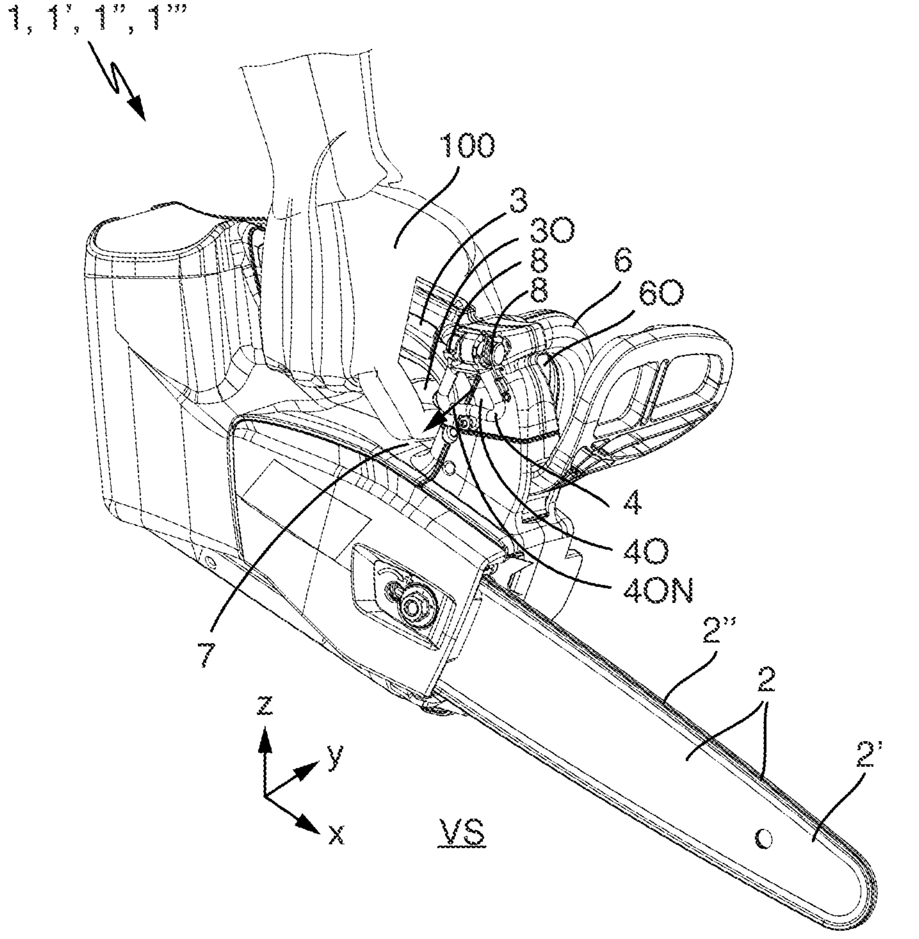
FIG. 5 is a perspective view of the working apparatus of FIG. 1 having the transport eyelet in a stowing position.
Figure 6:
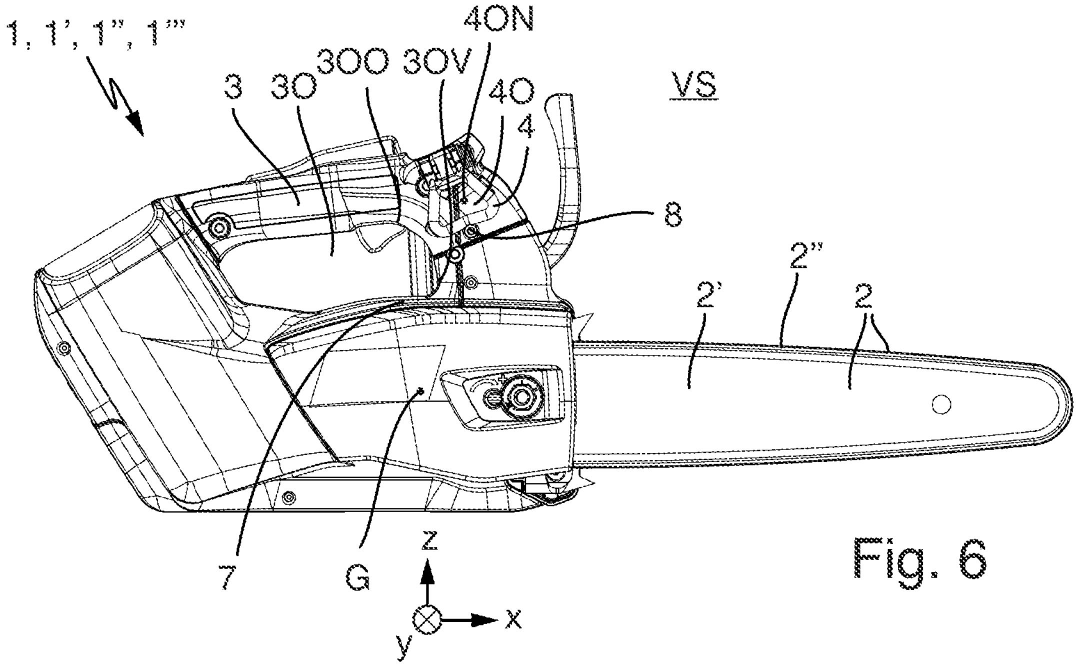
FIG. 6 is a top view of the working apparatus of FIG. 5.

In detail, the handle 3 is arranged for carrying by one hand 100 and the transport eyelet 4 is arranged for being simultaneously adjusted by the same hand 100, as shown in FIG. 5. In particular, the transport eyelet 4 is arranged on, in particular fastened to, the handle 3.

Furthermore, the working apparatus 1 has at least one locking member 8. The at least one locking member 8 is designed to fix, in particular fixes, the transport eyelet 4 in the attaching and/or detaching position EAS and/or in the stowing position VS.

In particular, the working apparatus 1 has a locking member 8 in the form of a stop and a locking member 8 in the form of a spring for fixing the transport eyelet 4 in the attaching and/or detaching position EAS by a form fit and a force fit. Additionally or alternatively, the working apparatus 1 has a locking member 8 in the form of a projection for fixing the transport eyelet 4 in the stowing position VS by a form fit.

In addition, a portion 4*a* of an outer contour 4A of the transport eyelet 4 has a depression 4T for opening a snapper 9 of the apparatus securing element 5 having a snap hook 10 for hooking the transport eyelet 4 in the snap hook 10, as shown in FIG. 8. In particular, the portion 4*a* of the outer contour 4A faces away from the handle 3, in particular and is remote therefrom, in the attaching and/or detaching position EAS.

Furthermore, a portion 4*b* of an inner contour 4I of the transport eyelet 4 is shaped for opening the snapper 9 of the apparatus securing element 5 having the snap hook 10 for unhooking the transport eyelet 4 from the snap hook 10, as shown in FIG. 9. In particular, the portion 4*b* of the inner contour 4*l* faces away from the handle 3, in particular and is close thereto, in the attaching and/or detaching position EAS.

In particular, the transport eyelet 4 or the contour thereof is heart-shaped.

Once again in other words: a handle opening normal or orthogonal of the handle opening 3O points or is oriented approximately or substantially, in particular precisely, along or parallel to or on the transverse axis or in the transverse direction y of the working apparatus 1. In particular, the handle 3 or the handle opening 3O defines a handle opening plane, in particular lies in a handle opening plane, the handle opening normal being normal or orthogonal to the handle opening plane.

Additionally or alternatively, in the attaching and/or detaching position EAS of the transport eyelet 4, the eyelet opening 4O extends approximately or substantially, in particular precisely, along or parallel to the longitudinal axis x and/or the transverse axis y. Furthermore additionally or alternatively, in the stowing position VS of the transport eyelet 4, the eyelet opening 4O extends approximately or substantially, in particular precisely, along or parallel to the longitudinal axis x and/or the vertical axis z.

Furthermore additionally or alternatively, a further handle opening normal or orthogonal of the further handle opening 6O points or is oriented approximately or substantially, in particular precisely, along or parallel to or on the longitudinal axis or in the longitudinal direction x of the working apparatus 1. In particular, the further handle 6 or the further handle opening 6O defines a further handle opening plane, in particular lies in a further handle opening plane, wherein the further handle opening normal is normal or orthogonal to the further handle opening plane.

Moreover, what has been stated previously permits an orientation of the working apparatus 1, in particular in the form of the saw 1', and/or the working device 2, in particular in the form of the saw rail 2' and the saw chain 2", to the rear at a user or as shown in FIG. 1 when the transport eyelet 4 is attached or mounted in the apparatus securing element 5, in particular having the snap hook 10, arranged on, in particular fastened to, the climbing harness 50, in particular arranged on, in particular fastened to, the user, in particular by means of the force of gravity or gravitational force. This therefore makes it possible to avoid or even to prevent injury to the user by the working apparatus 1, in particular by its working device 2, in particular when transporting the working apparatus 1.

As the exemplary embodiments which are shown and have been described above make clear, the invention provides an advantageous hand-portable working apparatus which has improved properties and is therefore more user-friendly, and an advantageous system having such a working apparatus.

What is claimed is:

1. A hand-portable working apparatus, comprising:
- a working device;
- a handle, wherein
  - the handle is at least partially arranged behind the working device along a longitudinal direction of the working apparatus, and
  - the handle defines a handle opening, wherein the handle opening extends approximately along the longitudinal direction; and
- a transport eyelet, wherein
  - the transport eyelet is arranged at or before a front end of the handle opening along the longitudinal direction, and
  - the transport eyelet defines an eyelet opening, wherein
    - in an attaching and/or detaching position of the transport eyelet, an eyelet opening plane, orthogonal of the eyelet opening, is oriented approximately along a vertical axis of the working apparatus, and
    - the transport eyelet is arranged to a transverse side of a handle opening plane of the handle opening in the attaching and/or detaching position of the transport eyelet; wherein
- the working apparatus is one of; a leaf blower, a saw, a chainsaw, or a top-handle saw, and/or
- the working device has a blowing tube, or a saw rail and a saw chain.

2. The hand-portable working apparatus according to claim 1,
- wherein the handle opening extends approximately along the vertical axis, and
- wherein the transport eyelet is arranged approximately at or above an upper end of the handle opening along the vertical axis.

3. The hand-portable working apparatus according to claim 1,
- wherein the working device extends along the longitudinal direction.

4. The hand-portable working apparatus according to claim 1,
- wherein the working apparatus has a further handle, wherein at least the further handle defines a further handle opening, wherein the further handle is arranged opposite the transport eyelet to the side of the handle opening along the transverse axis, and
- wherein the further handle opening extends approximately along the transverse axis and approximately along the vertical axis, and/or wherein the further handle is arranged at or before the front end of the handle opening along the longitudinal direction.

5. The hand-portable working apparatus according to claim 4,
- wherein the handle with the front end of the handle opening, the transport eyelet and/or the further handle are/is arranged along the longitudinal direction at a center of gravity of the working apparatus.

6. The hand-portable working apparatus according to claim 4,
- wherein the handle, the transport eyelet and/or the further handle are/is arranged along the vertical axis above a center of gravity of the working apparatus.

7. The hand-portable working apparatus according to claim 4,
- wherein the working apparatus has an apparatus housing, and
- wherein the handle, the transport eyelet and/or the further handle are/is arranged along the vertical axis at the top of the apparatus housing.

8. The hand-portable working apparatus according to claim 1,
- wherein the transport eyelet is at least partially adjustable between the attaching and/or detaching position and a stowing position which is different from the attaching and/or detaching position,
- wherein the transport eyelet protrudes from the handle in the attaching and/or detaching position,
- wherein the transport eyelet lies against the handle in the stowing position, and/or
- wherein, in the stowing position, the eyelet opening plane orthogonal is oriented approximately along a transverse axis of the working apparatus.

9. The hand-portable working apparatus according to claim 8,
- wherein the handle is arranged for carrying by one hand and the transport eyelet is arranged for being simultaneously adjusted by the same hand, wherein the transport eyelet is arranged on the handle.

10. The hand-portable working apparatus according to claim 8, wherein the working apparatus has at least one locking member, and wherein the at least one locking member is designed to fix the transport eyelet in the attaching and/or detaching position and/or in the stowing position.

11. The hand-portable working apparatus according to claim 1, wherein a portion of an outer contour of the transport eyelet has a depression for opening a snapper of an apparatus securing element having a snap hook for hooking the transport eyelet in the snap hook, and wherein the portion of the outer contour faces away from the handle in the attaching and/or detaching position.

12. The hand-portable working apparatus according to claim 1, wherein a portion of an inner contour of the transport eyelet is shaped for opening a snapper of an apparatus securing element having a snap hook for unhooking the transport eyelet from the snap hook, and wherein the portion of the inner contour faces away from the handle in the attaching and/or detaching position.

13. The hand-portable working apparatus according to claim 1, wherein the handle with the front end of the handle opening and/or the transport eyelet are/is arranged along the longitudinal direction at a center of gravity of the working apparatus.

14. The hand-portable working apparatus according to claim 1, wherein the handle and/or the transport eyelet are/is arranged along the vertical axis above a center of gravity of the working apparatus.

15. The hand-portable working apparatus according to claim 1, wherein the working apparatus has an apparatus housing, wherein the handle and/or the transport eyelet are/is arranged along the vertical axis at the top of the apparatus housing.

16. A system, comprising:

an apparatus securing element; and a hand-portable working apparatus, the working apparatus comprising:

a working device;

a handle, wherein the handle is at least partially arranged behind the working device along a longitudinal direction of the working apparatus, and at least the handle defines a handle opening, wherein the handle opening extends approximately along the longitudinal direction; and a transport eyelet, wherein the transport eyelet is arranged at or before a front end of the handle opening along the longitudinal direction, and the transport eyelet defines an eyelet opening, wherein in an attaching and/or detaching position of the transport eyelet an eyelet opening plane, orthogonal of the eyelet opening, is oriented approximately along a vertical axis of the working apparatus, and the transport eyelet is arranged to a transverse side of a handle opening plane of the handle opening in the attachment and/or detaching a position of the transport eyelet; wherein the working apparatus is one of; a leaf blower, a saw, a chainsaw, or a top-handle saw, and/or the working device has a blowing tube or a saw rail and a saw chain.

17. The system according to claim 16, wherein the apparatus securing element is a climbing harness.

18. A hand-portable working apparatus, comprising:

a working device;

a handle, wherein the handle is at least partially arranged behind the working device along a longitudinal direction of the working apparatus, and the handle defines a handle opening, wherein the handle opening extends approximately along the longitudinal direction; and a transport eyelet, wherein the transport eyelet is arranged at or before a front end of the handle opening along the longitudinal direction, and the transport eyelet defines an eyelet opening, wherein in an attaching and/or detaching position of the transport eyelet, an eyelet opening plane, orthogonal of the eyelet opening, is oriented approximately along a vertical axis of the working apparatus, and the longitudinal direction and the vertical axis define a plane, on which side the transport eyelet is arranged in the attaching and/or detaching position of the transport eyelet; wherein the working apparatus is one of: a leaf blower, a saw, a chainsaw, or a top-handle saw, and/or the working device has a blowing tube, or a saw rail and a saw chain.

* * * * *